US008219934B2

(12) United States Patent
MacHeffner

(10) Patent No.: US 8,219,934 B2
(45) Date of Patent: Jul. 10, 2012

(54) METHOD AND CODE MODULE FOR FACILITATING NAVIGATION BETWEEN WEBPAGES

(75) Inventor: Kevin M. MacHeffner, Higley, AZ (US)

(73) Assignee: General Dynamics C4 Systems, Inc., Falls Church, VA (US)

( * ) Notice: Subject to any disclaimer, the term of this patent is extended or adjusted under 35 U.S.C. 154(b) by 1956 days.

(21) Appl. No.: 10/915,496

(22) Filed: Aug. 9, 2004

(65) Prior Publication Data

US 2006/0031771 A1 Feb. 9, 2006

(51) Int. Cl.
*G06F 3/01* (2006.01)
*G06F 3/05* (2006.01)
*G06F 17/30* (2006.01)

(52) U.S. Cl. ......... 715/854; 715/853; 715/855; 711/137

(58) Field of Classification Search .......... 715/853–855; 711/137
See application file for complete search history.

(56) References Cited

U.S. PATENT DOCUMENTS

| 6,092,074 | A | 7/2000 | Rodkin et al. | |
| 6,344,851 | B1 | 2/2002 | Roberts et al. | |
| 6,411,999 | B1 | 6/2002 | Tinkler | |
| 7,191,411 | B2 * | 3/2007 | Moehrle | 715/855 |
| 7,216,301 | B2 * | 5/2007 | Moehrle | 715/811 |
| 2002/0194434 | A1 * | 12/2002 | Kurasugi | 711/137 |

OTHER PUBLICATIONS

Key words search when search a website in URL list of web browser, May 24, 2007, IP.com.*
Papadimitriou et al., Output URL bidding, Dec. 2010, Proceedings of the VLDB Endowment, vol. 4, Iss.3.*
Geldof, Context-sensitive hypertext generation, AAAIi97 Spring Symposium Workshop on Natural Language Processing for the Web, Stanford, CA, Jun. 23, 2004, 13 pgs.
Mathe; Chen, Adaptive Dynamic Hypertext Based on Paths of Traversal, Advanced Interaction Media Group, NASA Ames Research Center, Moffett Field, CA, Jun. 28, 2004, 3pgs.
Wolfram, Thoughts About This Site, http://wolfram.org/credits.html, Jun. 23, 2004, 3pgs.
Frick, DOI's, Open URL's and Context Sensititve Linking, University of Richmond, May 22, 2003, 15 pgs.

* cited by examiner

*Primary Examiner* — Jordany Nunez
(74) *Attorney, Agent, or Firm* — Meschkow & Gresham, P.L.C.

(57) ABSTRACT

A method (104), operable on a processor platform (24), and a code module (38) facilitate navigation between webpages (34) of a website (32). The code module (38) is incorporated into the webpages (34), and is executed at the processor platform (24) when one of the webpages (34) is downloaded to the processor platform (24). Upon execution of the code module (38), a destination address (36) for the downloaded webpage (34) is obtained. When one or more keywords are detected in the destination address (36), a thread of navigation links (124) related to the keywords is generated and displayed within the current website. The navigation links (124) reference other webpages (34) of the website (32) pertinent to the current webpage (34), and these other webpages (34) can be downloaded when their associated navigation links (124) are activated.

11 Claims, 6 Drawing Sheets

```
// Obtain destination address for webpage.
var theURL = (window.location.href.valueOf());
```
```
// Initialize the variable "theMenu".
var theMenu = "<a href='http://pg1'>MY WEBSITE</a>
<span class='location'>></span> <a
href='http://pg1/pg2/'>WEBPAGE2</a>;
```
```
// Generate navigation links related to the keywords.
// For WEBPAGE3, the keyword = pg3.
if ((theURL.indexOf("pg3")!=-1 {
theMenu += "span class ='location'>></span> <a
href='http://pg1/pg2/pg3.htm'>WEBPAGE3</a>";
}

// For WEBPAGE 4, the keyword = pg4 or page4.
if ((theURL.indexOf("pg4")!=-1 ||
(theURL.indexOf("page4")!=-1)) {
theMenu += "<span class='location'>></span> <a
href='http:// pg1/pg2/pg3.htm'>WEBPAGE3</a>
<span class='location'>></span> <a
href='http://page4.com'>WEBPAGE4</a";
}

// For WEBPAGE7, the keyword = pg7.
if (theURL.indexOf("pg7")!=-1 {
theMenu += "<span class='location'>></span> <a
href='http:// pg1/pg2/pg3.htm'>WEBPAGE3</a>
<span class='location'>></span> <a
href='http://pg1/pg2/pg7'>WEBPAGE7</a>";

//WEBPAGE8 is a child of WEBPAGE7, and keyword = pg8.
    if (theURL.indexOf("pg8")!=-1) {
    theMenu += "<span class='location'> > </span><a
    href='http: pg1/pg2/pg7/pg8'>WEBPAGE8</a>";
    }
}

// Any additional navigation links.
if (theURL.indexOf ("_")!=-1 {create hierarchical
navigation links related to keyword "_";
}
```
```
// Display navigation links in the current webpage.
Document.write(theMenu);
```

FIG. 3

METHOD AND CODE MODULE FOR FACILITATING NAVIGATION BETWEEN WEBPAGES

TECHNICAL FIELD OF THE INVENTION

The present invention relates to the field of computer networks. More specifically, the present invention relates to facilitating navigation between webpages of a website accessible through a computer network.

BACKGROUND OF THE INVENTION

The worldwide network of computers commonly referred to as the "Internet" has seen explosive growth in the last several years. Correspondingly, private networks that utilize the Internet protocol have also seen explosive growth. These private networks include, for example, intranets, i.e., networks used internally in an organization, and extranets, i.e., networks that securely share part of an organization's information or operations with suppliers, vendors, partners, customers, or other businesses.

These computer networks continue to evolve as new forms of technology are applied to the basic Internet infrastructure which consists of many elements, not the least of which are the Web browser and websites accessed utilizing the Web browser. A website is a collection of webpages, i.e., documents accessible via the computer network. The webpages are generally accessed from a common root destination address, typically a Uniform Resource Locator (URL), and can reside on the same physical server, or multiple servers. The URLs of the webpages are organized in a hierarchy, although the hyperlinks between them control how the user perceives the overall structure of the website.

The number of webpages that form a website, and the associated amount of information that may be available through such a website, continues to increase. Moreover, specific presentation methods vary widely from website to website without any consistency, and thus, leave users uncertain as to what types of information the websites generally maintain. Even when a user knows in advance that a website contains certain types of information, the website may not present to the user a guide as to how to directly access that information from a given webpage in the website. Consequently, the user may be required to manually search through the individual pages of a website.

Searching through a website, however, can be time consuming, and the downloading process can take a significant amount of time, especially when a user has to bring up several webpages to reach a desired webpage. Moreover, if the website contains a large amount of information not relevant to a particular user's interest, it may be difficult for the user to locate the information he or she requires. If it is too difficult or takes too much time to locate the desired information, a frustrated user may switch to a different website or simply log off.

Accordingly, developers of complex websites face the critical problem of how to facilitate navigation through the myriad of information available in a complex, multiple webpage, website. In particular, it is highly desirable to enable users of the website to rapidly locate relevant webpages within a website.

Attempts have been made to facilitate website navigation by employing search facilities within the website. While the use of a search engine within a website is an improvement over manually searching and downloading multiple webpages, the use of a search engine can be problematic if the user is unable to articulate the appropriate keywords for entry into the search engine. Moreover, a search engine leads a user to webpages without showing them their context within the rest of the website. If a user finds a webpage through a search, finding it again means having to remember exactly what search query they entered the first time. Such an activity is not an easy thing to do.

Thus, what is needed is a technique for facilitating navigation in a website, the technique being readily implemented within a website and readily adaptable to the changing profile of a website.

SUMMARY OF THE INVENTION

Accordingly, it is an advantage of the present invention that a method and code module are provided for facilitating navigation between webpages of a website.

It is another advantage of the present invention that a method and code module are provided that present a navigation hierarchy within a webpage based upon a currently visited webpage.

Another advantage of the present invention is that the code module can be adapted to yield a navigation hierarchy of a desired complexity.

Yet another advantage of the present invention is that the code module is readily incorporated into a website without necessitating updates to individual webpages.

The above and other advantages of the present invention are carried out in one form by a method, operable at a processor platform, for facilitating navigation from a webpage of a website. The method calls for obtaining a destination address for the webpage and detecting a keyword in the destination address. The method further calls for generating navigation links related to the keyword, and displaying the navigation links on a display of the processor platform.

The above and other advantages of the present invention are carried out in another form by a computer-readable code module for facilitating navigation between webpages of a website. The code module is configured for incorporation into the webpages, and is configured for execution when one of the webpages is downloaded to a processor platform. The computer-readable code module includes means for obtaining a destination address for the one of the webpages when the one of the webpages is downloaded to the processor platform. The code module further includes means for detecting a keyword in the destination address, means for generating navigation links related to the keyword, and means for displaying the navigation links in a hierarchical order within the webpage on a display of the processor platform.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 3 shows a listing of an exemplary computer readable code module in accordance with the preferred embodiment of the present invention;

DETAILED DESCRIPTION OF THE PREFERRED EMBODIMENTS

Figure 1:
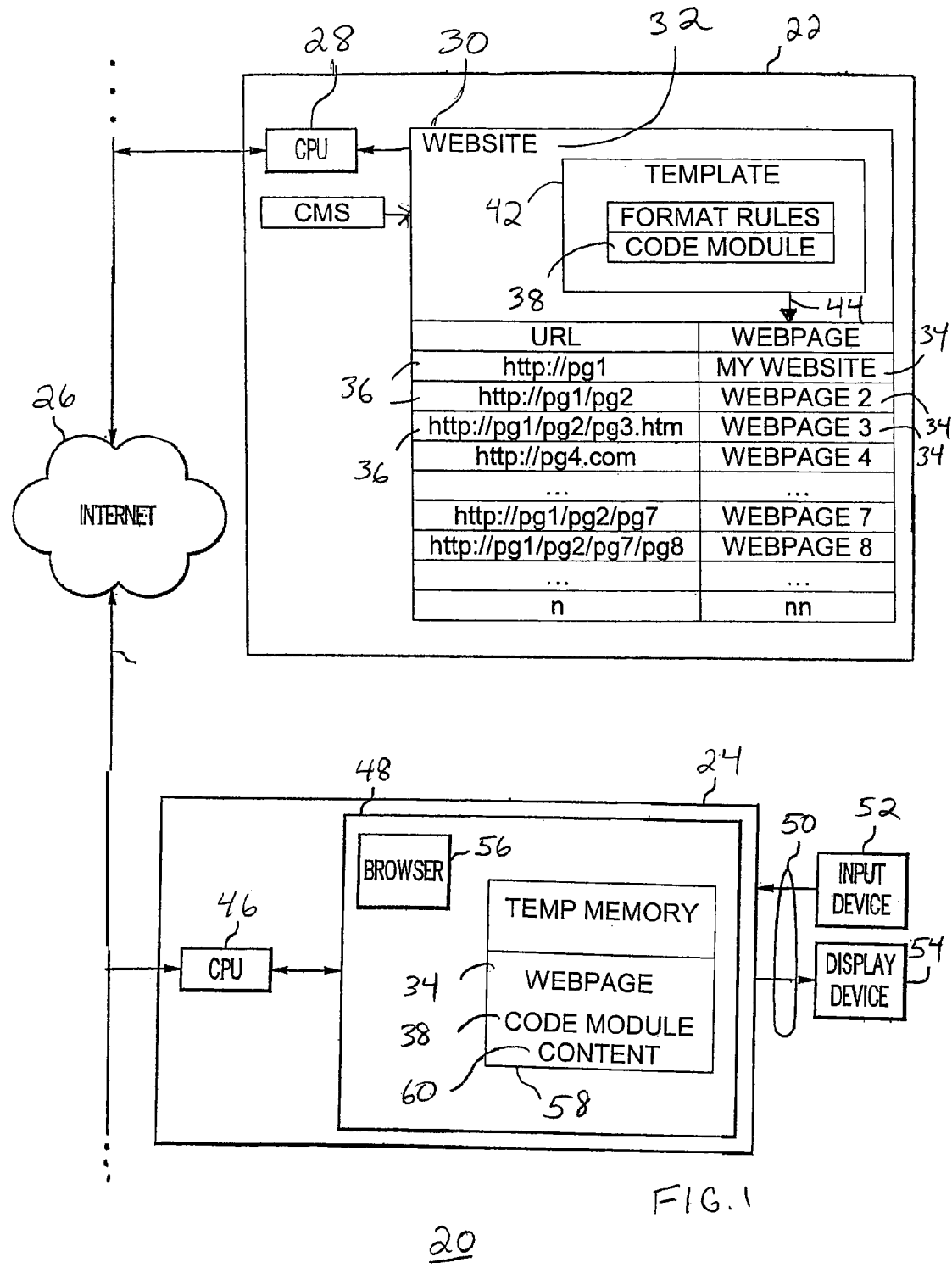
FIG. 1 shows a block diagram of a network environment in which the present invention may be deployed.

FIG. 1 shows a block diagram of a network environment 20 in which the present invention may be deployed. Network environment 20 includes a server system 22 and a processor platform 24. Server system 22 and processor platform 24 are connected together via a network 26. In an exemplary embodiment, network 26 represents the Internet. However, network 26 can also represent an intranet, an extranet, or other network architectures based on Internet Protocols. It should be readily apparent to those skilled in the art that network environment 20 also includes many more server systems and processor platforms which are not shown for the sake of clarity.

Server system 22 includes a central processing unit (CPU) 28 and a memory 30. Memory 30 includes a website 32 formed from a collection of webpages 34, i.e., documents, that are accessible via network 26. In an exemplary embodiment, webpages 34 are generated in HyperText Markup Language (HTML). HTML is the authoring software language used on the Internet's World Wide Web for creating webpages. A unique destination address 36, also known as a web address, is associated with each of webpages 34 in memory 30. Destination address 36 may be a Universal Resource Locator (URL), or string expression used to locate one of webpages 34 via network 26. Only a few webpages 34 and their associated destination addresses 36 are shown for simplicity of illustration. However, those skilled in the art will understand that website 32 may include many more webpages 34.

Website 32 includes a code module 38 in accordance with the present invention. Code module 38 is generated utilizing a client-side scripting language (such as, JavaScript), and is executed at processor platform 24 when any of webpages 34 are downloaded to processor platform 24. When executed, code module 38 dynamically generates and displays navigation links (discussed below). The navigation links are hyperlinks, or references, to other webpages 34 of website 32 that are relevant to (i.e., context-sensitive to) the one of webpages 34 that is currently downloaded.

In an exemplary embodiment, the content of website 32 may be managed through a content management system (CMS) 40, also referred to as a web content management system. CMS 40 allows end-users (typically authors, web developers, software engineers, and such) to provide new content to website 32 in the form of articles. The articles are typically entered as plain text. CMS 40 then uses rules to style the article, which separates the display from the content. This separation of the display and content enables a developer to get many articles to conform to a consistent "look and feel." CMS 40 applies, or links, a template 42 to each of webpages 34 through a pointer 44.

Template 42 carries the formatting rules for webpages 34. In addition, code module 38 is incorporated into template 42 when a Web page developer designs website 32. That is, code module 38 is an external JavaScript file that is coded, checked, and then transplanted into template 42. As such, code module 38 is linked to each of webpages 34 via pointer 44. Since code module 38 is incorporated into template 42, only one copy of code module need be present in association with website 32. Thus, code module 38 can be readily updated in accordance with new or deleted webpages, checked, and transplanted into template 42 so that the updated code module 38 is executed whenever any of webpages 34 are downloaded. Code module 38 will be discussed in greater detail below.

It should be readily apparent to those skilled in the art that server system 22 also includes additional components such as input/output lines, a keyboard and/or mouse, and a display terminal which are not shown for the sake of clarity. In addition, memory 30 also contains additional information, such as application programs, operating systems, data, etc., which also are not shown for the sake of clarity. Although the collection of webpages 34 that make up website 32 usually reside on the same physical server, the present invention is not limited to such a configuration. Accordingly, webpages 34 may be located on more than one server system.

Second processor platform 24 includes a CPU 46, a memory 48, input/output lines 50, an input device 52, such as a keyboard and/or mouse, and a display device 54, such as a display terminal. Memory 48 includes Web browser software 56 and a temporary memory 58. Those skilled in the art will understand that memory 48 also contains additional information, such as application programs, operating systems, data, etc., which are not shown in FIG. 1 for the sake of clarity.

Web browser 56 is software which navigates a web of interconnected documents on the World Wide Web via network 26. When one of webpages 34 of website 32, is accessed through the associated one of destination addresses 36, Web browser 56 moves a copy of the one of webpages 34 into temporary memory 58. Web browser 56 uses HyperText Transfer Protocol (HTTP) for communicating over network 26.

In accordance with the present invention, when Web browser 56 downloads the copy of the one of webpages 34, a copy of code module 38 is downloaded to temporary memory 58 along with webpage content 60. In response to downloading the one of webpages 34, Web browser 56 automatically executes code module 38, a copy of which is now stored in temporary memory 58. Through the execution of code module 38, navigation links (discussed below) in the form of hyperlinks are generated and displayed in a hierarchical order within the webpage 34 on display device 54. Code module 38 generates the navigation links utilizing destination addresses 36 as a dynamic key to generate the hierarchical order of navigation links.

Figure 2:
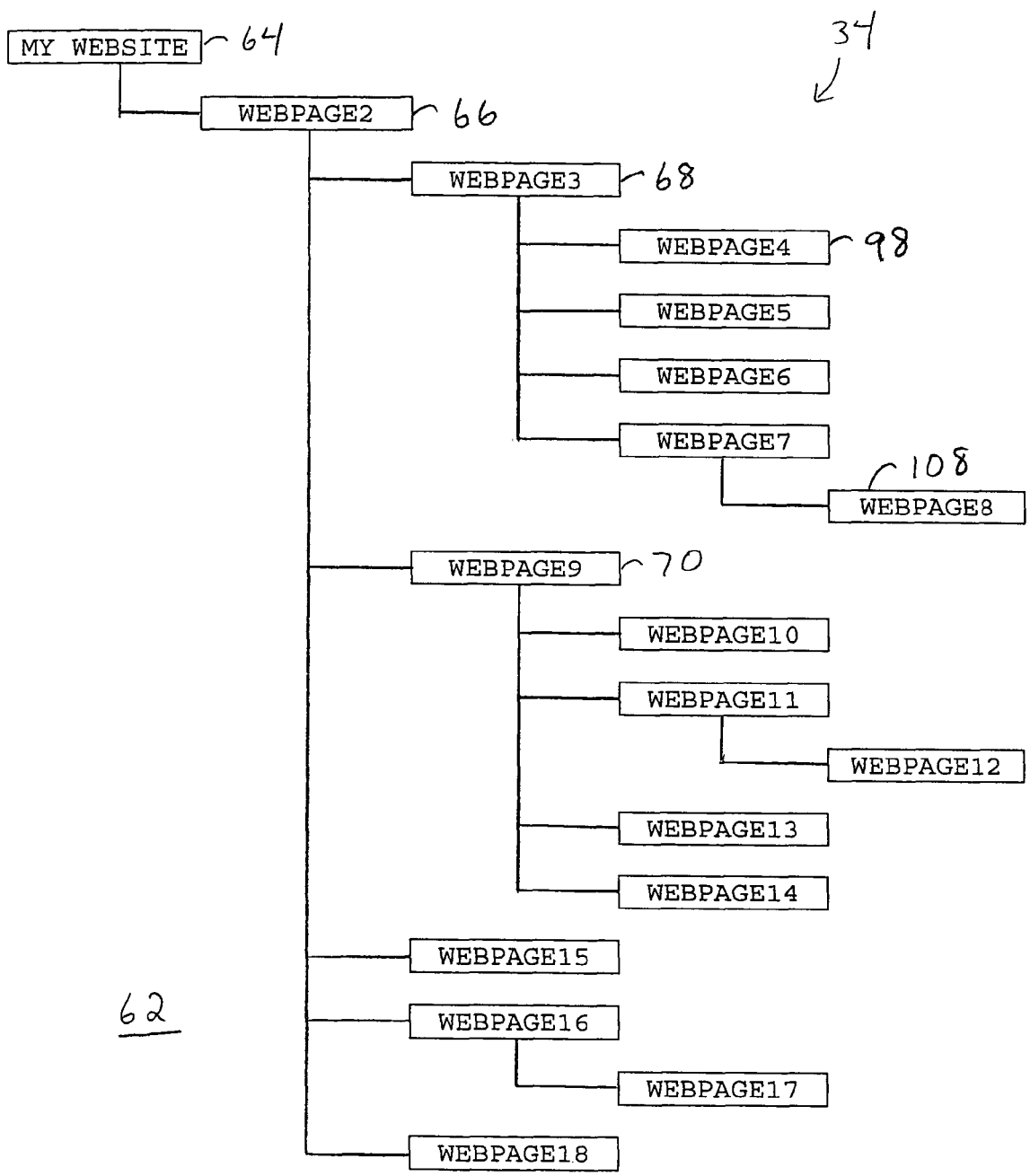
FIG. 2 shows a block diagram of an exemplary hierarchy of webpages that form a website.

FIG. 2 shows a block diagram of an exemplary hierarchy 62 of webpages 34 that form website 32 (FIG. 1). In general, a hierarchy is a system of ranking or organizing things, in this case, organizing webpages 34 of website 32. Web developers typically organize their websites into some sort of logical navigation system. That structure often takes the form of a tree, with tree branches defining different subjects and categories.

When two nodes, or in this case, two webpages 34, are related, one is designated the "superior" (or sometimes the "parent") and the other is the "subordinate" (or sometimes the "child"). As shown, website 32 is organized according to a simple hierarchy, or tree structure, having a home page 64, i.e., the "superior", at the top and related webpages 34 that are subordinate to home page 64.

In a hierarchical system, as represented by hierarchy 62, entities can be linked in one of three ways: directly, indirectly, or not at all. For example, hierarchy 62 shows a direct link between home page 64 and a second one of webpages 34, hereinafter referred to as a second webpage 66. A third one of webpages 34, hereinafter referred to as a third webpage 68 is indirectly related to home page 64 via its direct link to second webpage 66. However, there is effectively no link between third webpage 68 and a ninth one of webpages 34, hereinafter referred to as a ninth webpage 70.

Getting lost within a website, such as website 32 is a common complaint from network users. Visitors often come across a useful webpage 34 while browsing, and then forget where to find it by their next visit to the site, or fail to understand it's relationship to related webpages 34 within website 32, or cannot locate other webpages 34 within website 32 that have related information.

Code module 38 dynamically generates the navigation links, i.e., hyperlinks to webpages 34 that are directly or indirectly related to the currently visited one of webpages 34. These navigation links are presented within the webpage 34 to enable a user to navigate to other webpages 34 whose relationship to the current webpage 34 is defined by the web developer. It should be understood, however, that the present invention need not be limited to linking directly or indirectly related webpages 34 as defined within hierarchy 62 (FIG. 2). Rather, a Web developer may also determine the necessity of presenting navigation links for non-related webpages 34 within the current webpage.

FIG. 3 shows a listing of an exemplary computer readable code module 38 in accordance with the preferred embodiment of the present invention. Code module 36 may be generated in JavaScript. JavaScript is an object-oriented scripting language commonly used in websites to create dynamic web applications. One typical use of JavaScript is to write functions that are embedded in HTML webpages, which are subsequently executed on client machines. Although the present invention is generated utilizing JavaScript, it should be understood that other existing or upcoming scripting languages may be utilized for generating the code module of the present invention. As mentioned previously, code module 38 is incorporated into template 42 (FIG. 1) which is subsequently applied to each of webpages 34 (FIG. 1) via pointer 44 (FIG. 1). Code module 38 utilizes destination address 36 (FIG. 1) of the visited one of webpages 34 as a key to dynamically produce navigation links that reference other related webpages 34 within website 32.

A first command section 74 of code module 38 obtains destination address 36 (FIG. 1) for the one of webpages 34 currently being downloaded into temporary memory 58 (FIG. 1) utilizing Web browser 56. As shown, the variable "theURL" is a named memory location into which code module 38 can store data. In this exemplary scenario, the current webpage 34 destination address 36 (URL), as referred to by "window.location" with "href" being the attribute that contains the current destination address 36 to the one of webpages 34, is stored in the variable "theURL".

In this exemplary code module 38, a second command section 76 initializes a variable "theMenu" to include a first navigation link 78 entitled ">MY WEBSITE" and a second navigation link 80 entitled ">WEBPAGE 2". First navigation link 78 is associated with a first keyword 82, i.e., "pg1" in destination address 36. Similarly, second navigation link 80 is associated with a second keyword 84, i.e., "pg2" in destination address 36. Accordingly, when first and second keywords 82 and 84, respectively, are detected in destination address 36, third command section 86 yields a thread of navigation links, as follows:

MY WEBSITE>WEBPAGE2

In this case, first and second keywords 82 and 84, respectively, may be detected in destination address, and two navigation links, i.e. first and second navigation links 78 and 80, are generated in response to the first and second keywords. This thread of navigation links 78 and 80 will be presented within any currently viewed one of webpages 34 (FIG. 1) of website 32 (FIG. 1) so that a user will understand the relationship of the currently viewed webpage 34 to home page 64 (FIG. 2). Moreover, clicking either of first and second navigation links 78 and 80, respectively, will take the user to that level within website 32 (FIG. 1).

First and second navigation links 78 and 80 correspond to home page 64 (FIG. 2) and second webpage 66 (FIG. 2) of hierarchy 62, and are being provided for illustrative purposes. It should be apparent to those skilled in the art that the definition of navigation links is determined by a web developer in response to a particular website hierarchy defined by the developer.

A third command section 86 of code module 38 detects additional keywords and generates additional navigation links related to the additional keywords found within destination address 36 (FIG. 1) of the currently visited one of webpages 34. For example, a third keyword 88, i.e., "pg3", is related to third webpage 68 (FIG. 2) of hierarchy 62 in a first subsection 90 of third command section 86. First subsection 90 generates a third navigation link 92, and associates it with third keyword 88. When third keyword 88 is detected in destination address, first subsection 90 is executed and adds third navigation link 92 to the thread of navigation links, as indicated by the operator "+=". Accordingly, first subsection 90 of third command section 86 yields a thread of navigation links, as follows:

MY WEBSITE>WEBPAGE2>WEBPAGE3

Again, clicking any of first, second, and third navigation links 78, 80, and 92, respectively, will take the user to that level within website 32 (FIG. 1). Other subsections of third command section 86 are representative of the generation of different threads of navigation links in response to keywords detected in a destination address 36 of a current one of webpages 34.

Another example presented within third command section 86 is a second subsection 94 in which a fourth keyword 96 may be one of two choices, i.e., "pg4" or "page4". Fourth keyword 96 is related to a fourth one of webpages 34, referred to hereinafter as fourth webpage 98. When fourth keyword 96, either "pg4" or "page4", is detected in destination address, second subsection 94 is executed and adds a fourth navigation link 100 to the thread of navigation links. Accordingly, second subsection 94 of third command section 86 yields a thread of navigation links, as follows:

MY WEBSITE>WEBPAGE2>WEBPAGE3>WEBPAGE4

The configuration of code module 38 establishes a hierarchy for the navigation links. That is, as set forth in code module 38, first, second, third, and fourth navigation links 78, 80, 92, and 100, respectively, are presented in a hierarchical order. In particular, each navigation link to the right of its neighbor or neighbors is subordinate to that neighbor or neighbors. When a user activates any of first, second, third, and fourth navigation links 78, 80, 92, and 100, the one of webpages 32 associated with the activated one of first, second, third, and fourth navigation links 78, 80, 92, and 100 will be downloaded by Web browser 56 (FIG. 1).

The generation of only a few navigation links is presented in code module 38 for simplicity of illustration. In actuality, a Web developer can adapt the code module exemplified herein to identify multiple keywords within multiple destinations for a plurality of webpages 34 of website 32, and to include any number of navigation links related to hierarchy 62 (FIG. 2) of webpages 34 (FIG. 1) that form website 32 (FIG. 1). Moreover, those skilled in the art will recognize that third command section 86 can be readily adapted to generate any number of navigation links in response to a particular website hierarchy defined by the web developer.

When executed, a fourth command section 102 causes the navigation links generated in response to second and third command sections 76 and 86, respectively, to be displayed on display device 54 (FIG. 1) with the currently downloaded one of webpages 34. For example, the statement "document.write" displays the data (i.e., the navigation links) stored in the variable "theMenu" within the currently displayed one of webpages 34.

Figure 4:
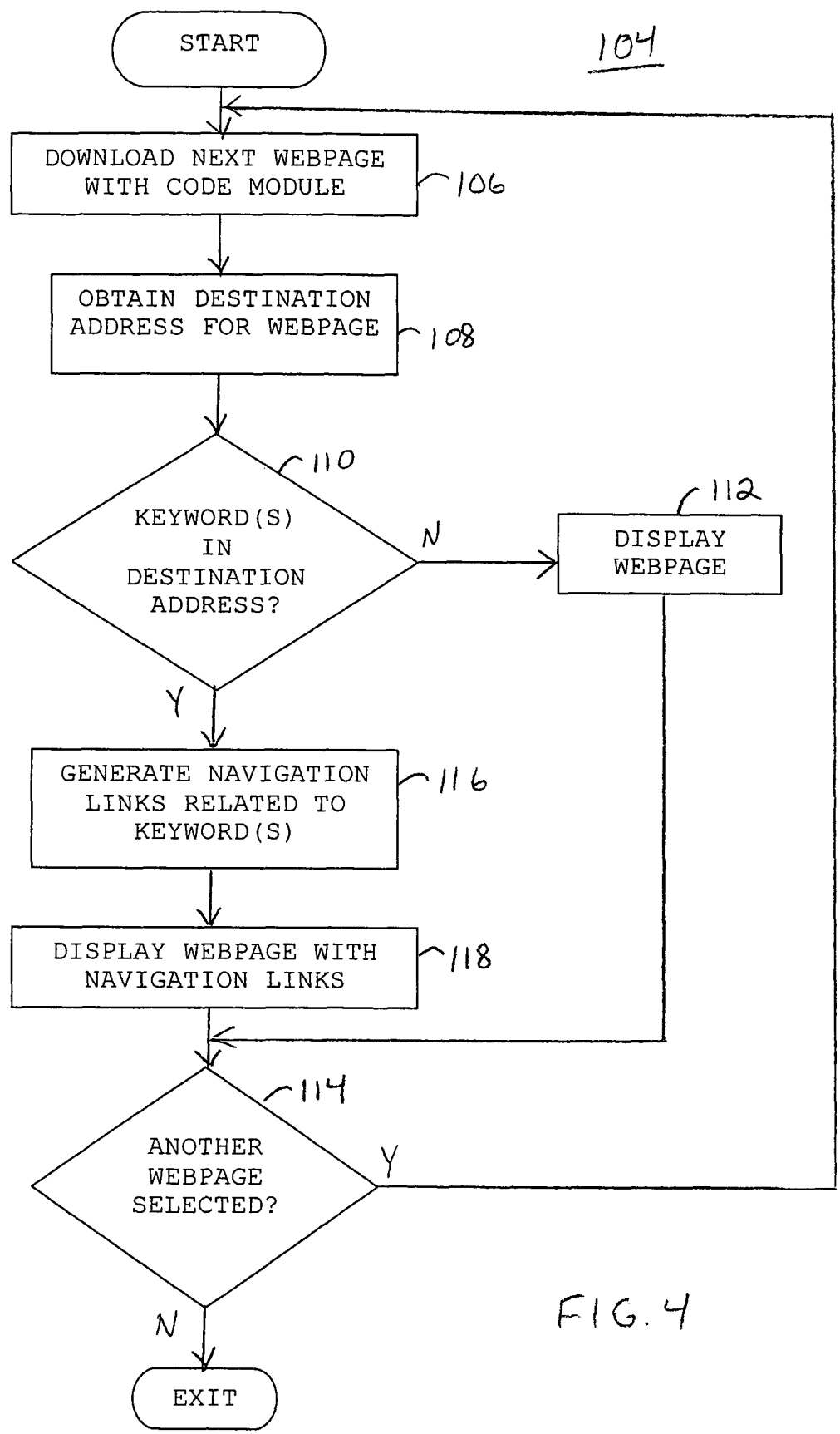
FIG. 4 shows a flow chart of a web page navigation process that incorporates the code module of FIG. 3.

FIG. 4 shows a flow chart of a website navigation process 104 that incorporates code module 38 (FIG. 3). Website navigation process 104 is performed when Web browser 56, operated by a user at processor platform 24 (FIG. 1), downloads one of webpages 34 of website 32 for display on display device 54 (FIG. 1). It should be understood that Web browser 56 functions per convention to download a webpage, whether the webpage is any webpage available on network 26 (FIG. 1) or whether the webpage is one of webpages 34. Webpage navigation process 104 is executed when a webpage is downloaded that has code module 38 incorporated therein.

Process 104 begins with a task 106. Task 106 causes Web browser 56 (FIG. 1) to download webpage 34 at processor platform 24. In other words, Web browser 56 moves a copy of a next one of webpages 34, with the incorporated code module 38 into temporary memory 54 (FIG. 1) of processor platform 24. Of course, at a first iteration of task 106, the "next" one of webpages 34 will actually be a first one of webpages 34, although the first accessed webpage may be any of webpages 34 within website 32 (FIG. 1). When one of webpages 34 is downloaded at processor platform 24, Web browser 56 automatically executes code module 38 incorporated in webpage 34, a copy of which is now stored in temporary memory 54.

A task 108 is performed in response to task 106. At task 108, the one of destination addresses 36 (i.e., the URL) for the current one of webpages 34 is obtained, as explained in connection with first command section 74 (FIG. 3) of code module 38 (FIG. 3).

The continued execution of code module 38 results in the execution of a query task 110. At query task 110, a determination is made as to whether any keywords (for example, first, second, third, and fourth keywords 82, 84, 88, and 96) are detected in destination address 36 obtained at task 108. When there are no keywords, process control proceeds to a task 112. At task 112, the currently downloaded one of webpages 34 is displayed on display device 54 (FIG. 1). Process 104 subsequently proceeds to a query task 114 (discussed below).

However, when one or more keywords are detected at query task 110, process control proceeds to a task 116. At task 116, navigation links (for example, first, second, third, and fourth navigation links 78, 80, 92, and 100) related to the detected keywords are generated, as explained in connection with second and third command sections 76 and 86, respectively (FIG. 3).

A task 118 subsequently displays the currently downloaded one of webpages 34. In accordance with the present invention, task 118 also causes the navigation links generated at task 116 to be presented within the currently downloaded one of webpages 34 in a hierarchical order corresponding to hierarchy 62 (FIG. 2), and as discussed above.

Following webpage/navigation link display task 118, process flow proceeds to query task 114. Similarly, and as mentioned above, following webpage display task 112, query task 114 is performed. At query task 114, a determination is as to whether another one of webpages 34 is selected. Selection may be detected when a user clicks on, i.e., activates, one of the navigation links presented on the currently displayed one of webpages 34. Of course, selection may also be detected when a user manually enters a URL into the address field of the webpage, or when a keyword is entered into a search engine (if available) specific to website 32.

When another of webpages 34 is selected, process flow loops back to task 106 to download the next one of webpages 34, to detect keywords within destination address 36 for the next one of webpages 34, to dynamically generate any navigation links related to the detected keywords, and to display the downloaded one of webpages 34 with the dynamically generated navigation links. However, when another of webpages 34 of website 32 is not selected, website navigation process 104 exits.

Figure 5:
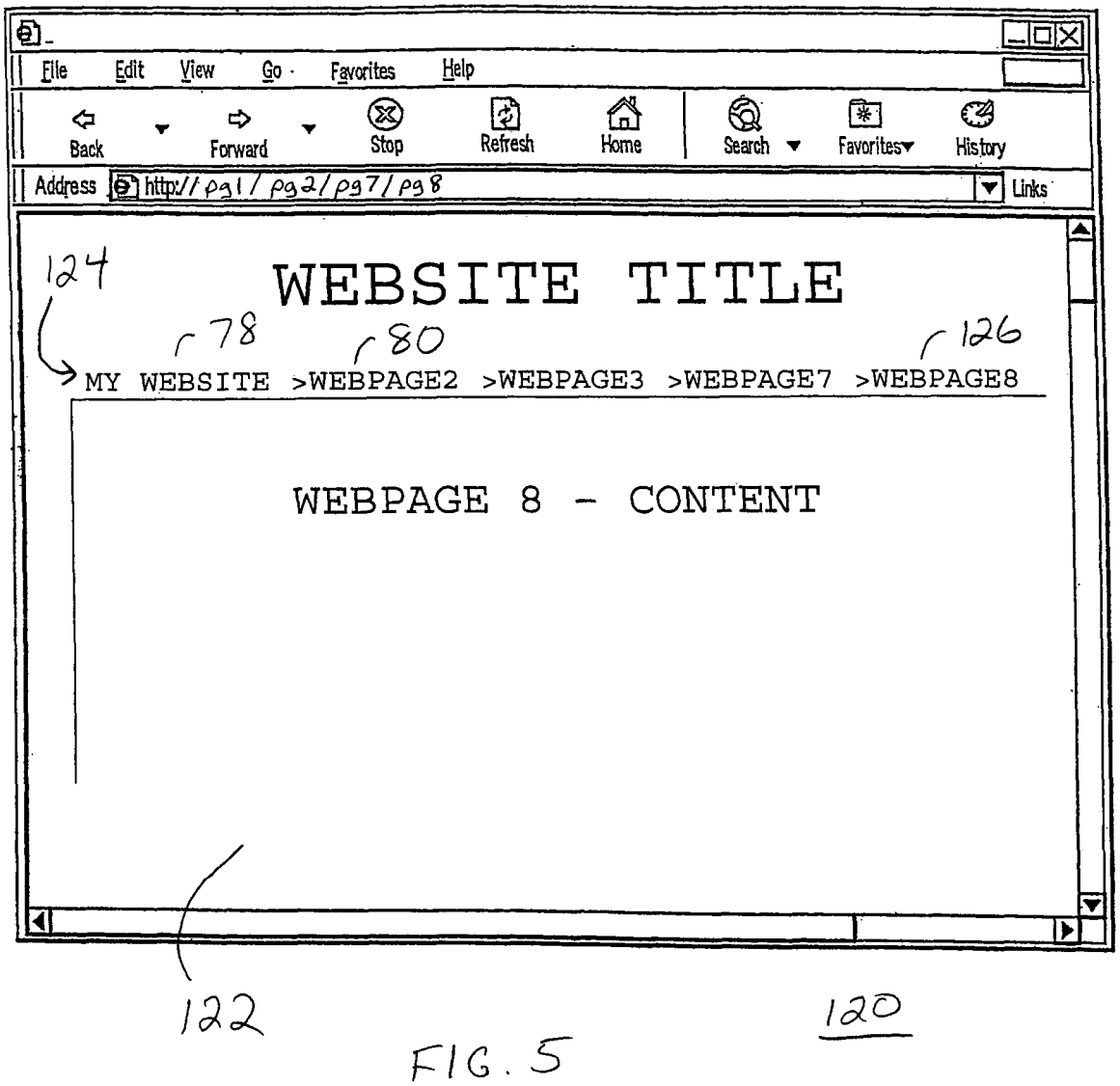
FIG. 5 shows a diagram of an electronic display of a webpage with a thread of navigation links presented therewith.

FIG. 5 shows a diagram of an electronic display 120 of one of webpages 34, hereinafter referred to as an eighth webpage 122, with a thread of navigation links 124 presented therewith. When eighth webpage 122 was downloaded by Web browser 56 (FIG. 2), code module 38 (FIG. 3) was executed to dynamically generate navigation links 124. Navigation links 124 are hyperlinks corresponding to the logical hierarchy for eighth webpage 122, as illustrated in hierarchy 62 (FIG. 2). In particular, navigation links 124 start with the superior link, i.e., first navigation link 78, for home page 64, present all pertinent subordinate levels, and end with the current level, i.e., an eighth navigation link 126 for eighth webpage 108. Clicking any of navigation links 110 will take the user to that level of website 32 (FIG. 1).

Figure 6:
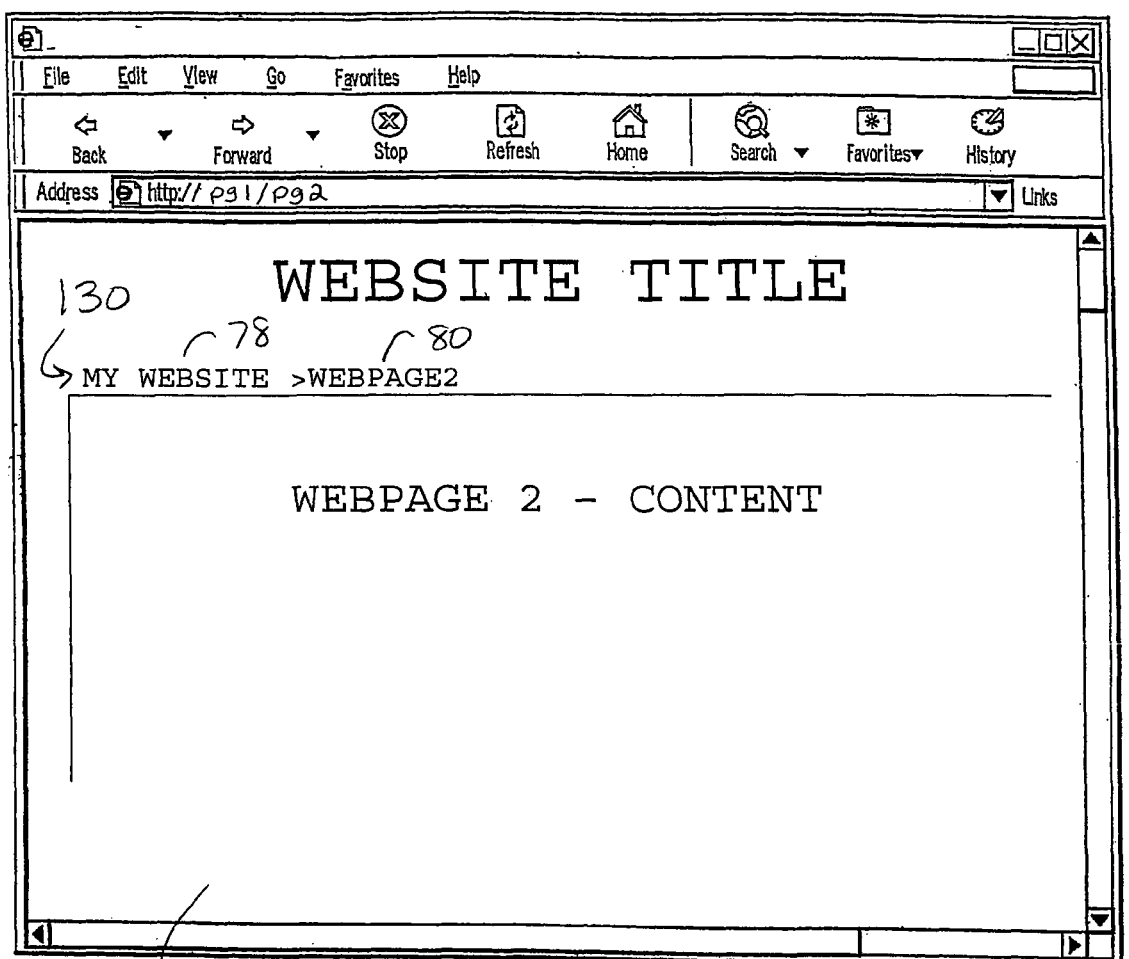
FIG. 6 shows a diagram of a second electronic display of a second webpage with a thread of second navigation links presented therewith.

FIG. 6 shows a diagram of a second electronic display 128 presenting second webpage 66 with a thread of second navigation links 130 generated and displayed when second webpage 66 was downloaded. Second webpage 66 may have been downloaded when the user clicked on second navigation link 80 presented as one of the thread of navigation links 124 (FIG. 5) within eighth webpage 122 (FIG. 5).

When second webpage 66 was downloaded, code module 38 (FIG. 3) was executed to dynamically generate second navigation links 130 corresponding to the logical hierarchy for second webpage 66, as illustrated in hierarchy 62 (FIG. 2). Second navigation links 130 start with the superior link, i.e., first navigation link 78, for home page 64 and end with second navigation link 80 for second webpage 66. At this level of website 32, the only two choices are first and second navigation links 78 and 80, respectively.

In summary, the present invention teaches of a method and code module that facilitate navigation between the webpages of a website. The method and code module present a thread of hierarchically ordered navigation links within a currently visited webpage. The navigation links are dynamically generated when the webpage is downloaded from keywords present within the destination address (URL) of the webpage. The code module may be incorporated into a template, the template being applied to each webpage. As such, the code module can be readily updated as webpages are added or removed from the website, thus being adaptable to the changing profile of a website. Moreover, the code module can be tested and then transplanted into the template without necessitating updates to individual webpages. Thus, intuitive navigation across a large website can be provided with little effort.

Although the preferred embodiments of the invention have been illustrated and described in detail, it will be readily apparent to those skilled in the art that various modifications may be made therein without departing from the spirit of the invention or from the scope of the appended claims. For example, formatting of the presented navigation links may take on many different styles. In addition, the navigation links may be complex or simple as defined by the Web developer.

What is claimed is:

1. A method, operable at a processor platform, for facilitating navigation from a webpage of a website comprising:
   obtaining a web address for said webpage, said webpage being one of a plurality of webpages within a hierarchically organized website, and said webpage being non-sequentially selected from said hierarchically organized website for download to said processor platform;
   detecting a first keyword and a second keyword in said web address;
   generating navigation links related to said first and second keywords; and
   displaying said navigation links on a display of said processor platform.

2. A method as claimed in claim 1 further comprising initiating said obtaining operation when said webpage is downloaded to said processor platform.

3. A method as claimed in claim 1 wherein said web address is a uniform resource locator (URL).

4. A method as claimed in claim 1 wherein said navigation links reference other webpages of said website, and said method further comprises enabling a user to activate one of said navigation links to download one of said other webpages.

5. A method as claimed in claim 4 further comprising:
   obtaining a second web address for said one of said other webpages when said one of said other webpages is downloaded;
   detecting a third keyword in said second web address;
   generating second navigation links related to said third keyword; and
   displaying said second navigation links on said display.

6. A method as claimed in claim 1 wherein said displaying operation presents said navigation links in a hierarchical order.

7. A method as claimed in claim 1 wherein said displaying operation presents said navigation links within said webpage.

8. A method as claimed in claim 1 wherein prior to said obtaining operation, said method further comprises:
   identifying said first and second keywords in said web address;
   defining said navigation links for relation with said first and second keywords in a code module; and
   associating said code module with said webpage for automatic execution at said processor platform when said webpage is downloaded to said processor platform.

9. A method as claimed in claim 8 further comprising:
   establishing a hierarchy for said navigation links in said code module; and
   enabling said displaying operation to present said navigation links in a hierarchical order in response to said establishing operation.

10. A method as claimed in claim 8 wherein:
    said identifying operation identifies multiple keywords within multiple web addresses for a plurality of webpages of said website;
    said defining operation defines said navigation links for each of said multiple keywords in said code module; and
    said associating operation associates said code module with each of said plurality of webpages for automatic execution at said processor platform when said each of said plurality of webpages is downloaded to said processor platform.

11. A method as claimed in claim 10 wherein content of said website is managed through a content management system (CMS), said CMS applies a template to said each of said plurality of webpages, and said associating operation comprises incorporating said code module into said template.

* * * * *